US012078071B1

(12) United States Patent
Bloom, Jr. et al.

(10) Patent No.: US 12,078,071 B1
(45) Date of Patent: Sep. 3, 2024

(54) SEGMENTED COMPRESSOR INNER BAND FOR VARIABLE VANES IN GAS TURBINE ENGINES

(71) Applicant: Rolls-Royce Corporation, Indianapolis, IN (US)

(72) Inventors: Joseph Bloom, Jr., Indianapolis, IN (US); Madeleine Eichenberg, Indianapolis, IN (US); Ethan Counen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/112,200

(22) Filed: Feb. 21, 2023

(51) Int. Cl.
*F01D 17/16* (2006.01)
*F01D 11/00* (2006.01)

(52) U.S. Cl.
CPC ............ *F01D 17/16* (2013.01); *F01D 11/005* (2013.01); *F05D 2220/32* (2013.01); *F05D 2230/60* (2013.01); *F05D 2240/11* (2013.01); *F05D 2240/128* (2013.01); *F05D 2260/60* (2013.01)

(58) Field of Classification Search
CPC ..... F01D 17/16; F01D 11/005; F05D 2220/32
See application file for complete search history.

(56) References Cited

U.S. PATENT DOCUMENTS 4,395,195 A * 7/1983 De Cosmo ............ F01D 17/162 415/137
6,129,512 A * 10/2000 Agram .................. F01D 17/162 415/229
6,413,043 B1 * 7/2002 Bouyer .................... F01D 9/042 29/451
6,682,299 B2 * 1/2004 Bowen ....................... F01D 9/02 384/273
6,790,000 B2 9/2004 Wolf
6,910,854 B2 * 6/2005 Joslin .................... F04D 29/542 415/191
7,713,022 B2 5/2010 Major et al.
7,753,647 B2 7/2010 Giaimo et al.
8,636,466 B2 1/2014 Cortequisse
8,951,010 B2 2/2015 Major et al.
9,062,687 B2 6/2015 Cortequisse
9,587,499 B2 * 3/2017 Albers ....................... F01D 9/04
9,926,944 B2 3/2018 Mouton et al.
10,060,444 B2 8/2018 Marshall et al.
10,066,668 B2 9/2018 Zotz
10,082,036 B2 9/2018 Vest
10,494,944 B2 12/2019 Humhauser
11,156,127 B2 10/2021 Albers et al.
11,168,574 B2 11/2021 Schwarz et al.
2003/0170115 A1 * 9/2003 Bowen ....................... F01D 9/02 415/160
2014/0140822 A1 5/2014 Capozzi et al.
2016/0010488 A1 1/2016 Albers et al.
2018/0112555 A1 4/2018 Humhauser
(Continued)

*Primary Examiner* — Eldon T Brockman
(74) *Attorney, Agent, or Firm* — Barnes & Thornburg LLP

(57) ABSTRACT

A compressor assembly for a gas turbine engine includes an outer band, a plurality of variable pitch vanes, and an inner band. The plurality of variable pitch vanes extend radially between the outer band and the inner band. The inner band extends circumferentially partway about an axis and includes an inner ring segment formed to define a channel and a plurality of vane mount segments interlocked with the inner ring segment in the channel.

19 Claims, 5 Drawing Sheets

(56) References Cited

U.S. PATENT DOCUMENTS

| | | | | |
|---|---|---|---|---|
| 2022/0228507 | A1 | 7/2022 | Faisal et al. | |
| 2023/0250729 | A1 * | 8/2023 | Korepin ................ | F01D 25/246<br>415/173.1 |

* cited by examiner

SEGMENTED COMPRESSOR INNER BAND FOR VARIABLE VANES IN GAS TURBINE ENGINES

FIELD OF THE DISCLOSURE

The present disclosure relates generally to gas turbine engines, and more specifically to inner vane bands for compressors in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Some vane assemblies include variable pitch vanes configured to selectively turn and vary their pitch angle to control the air flow exiting the vane assembly. It is desirable to provide variable pitch vane assemblies with inner bands that ease assembly of the components in the vane assemblies.

SUMMARY

The present disclosure may comprise one or more of the following features and combinations thereof.

According to an aspect of the present disclosure, a compressor assembly for a gas turbine engine includes an outer band, a plurality of variable pitch vanes, and an inner band. The outer band extends at least partway circumferentially around a central axis to define an outer boundary of a gas path of the compressor assembly. The plurality of variable pitch vanes are configured to vary a direction of a gas flowing through the gas path of the compressor assembly. Each of the plurality of variable pitch vanes extends radially inward from the outer band relative to the central axis. Each of the plurality of variable pitch vanes is configured to rotate about a pitch axis that extends radially outward from the central axis and through the corresponding variable pitch vane included in the plurality of variable pitch vanes.

The inner band extends circumferentially at least partway about the central axis and receives a portion of each of the plurality of variable pitch vanes. The inner band includes an inner ring segment and a plurality of vane mount segments. The inner ring segment is formed to define a radially outwardly opening channel that extends circumferentially around the inner ring segment. The plurality of vane mount segments are interlocked with the inner ring segment in the channel to define an inner boundary of the gas path of the compressor assembly. Each vane mount segment included in the plurality of vane mount segments is formed to include a bearing aperture that extends radially into the vane mount segment and receives a portion of a corresponding one of the variable pitch vanes included in the plurality of variable pitch vanes.

In some embodiments, each vane mount segment included in the plurality of vane mount segments is formed to define a circumferentially extending first groove. The inner ring segment includes a first tongue that extends axially into the first groove to interlock the vane mount segment with the inner ring segment.

In some embodiments, each vane mount segment included in the plurality of vane mount segments has a mount body and a seal member. The mount body has a circumferentially facing first wall and a circumferentially facing second wall spaced apart circumferentially from the circumferentially facing first wall. The circumferentially facing second wall is formed to define a slot that extends circumferentially into the circumferentially facing second wall. The seal member extends circumferentially from the circumferentially facing first wall of each vane mount segment that is received in the slot of a neighboring vane mount segment to block the gas from flowing axially between the plurality of vane mount segments.

In some embodiments, each seal member has a radial height and an axial width. The radial height is greater than the axial width.

In some embodiments, each vane mount segment included in the plurality of vane mount segments has a radially outer surface that defines a portion of the inner boundary of the gas path. The outer surface extends between a forward axial end at a first radial distance from the central axis and an aft axial end at a second radial distance from the central axis that is greater than the first radial distance. Each seal member extends radially outward beyond the first radial distance.

In some embodiments, the inner ring segment has a radially outward facing surface that defines the opening of the channel. The radially outward facing surface is located at a third radial distance from the central axis. Each seal member extends radially inward beyond the third radial distance and into the channel. In some embodiments, each seal member is located axially aft of the bearing aperture of each vane mount segment included in the plurality of vane mount segments.

In some embodiments, each vane mount segment has a radially outer surface. The radially outer surfaces of the plurality of vane mount segments form the entirety of the inner boundary of the gas path of the compressor assembly. In some embodiments, the radially outer surface of each vane mount segment extends at an angle relative to the central axis of between about 10 and about 20 degrees. In some embodiments, an entirety of the bearing aperture of each vane mount segment is located axially forward of an axial midpoint of the inner ring.

According to another aspect of the disclosure, a compressor assembly for a gas turbine engine includes an inner ring segment, a first vane mount segment, and a second vane mount segment. The inner ring segment extends partway circumferentially about a central axis. The inner ring segment is formed to define a radially outwardly opening channel that extends circumferentially around the inner ring segment. The first vane mount segment is located in the channel and interlocked with the inner ring. The first vane mount segment has a first mount body formed to define a first bearing aperture that extends radially inward into the first mount body and a seal member that extends circumferentially away from the first mount body. The second vane mount segment is located in the channel and interlocked with the inner ring. The second vane mount segment has a second mount body formed to define a second bearing aperture that extends radially inward into the second mount body and a second seal member. The second seal member extends circumferentially away from the second mount body and into the first mount body of the first vane mount segment to block gases from passing axially between the first vane mount segment and the second vane mount segment.

In some embodiments, the first mount segment is formed to define a circumferentially extending first groove that extends axially into the first mount body. The inner ring segment includes a first tongue that extends axially into the first groove to interlock the first vane mount segment with the inner ring segment. In some embodiments, the second seal member has a radial height and an axial width and the radial height is greater than the axial width.

In some embodiments, the first vane mount segment has a radially outer surface that defines a portion of an inner boundary of a gas path. The outer surface extends between a forward axial end at a first radial distance from the central axis and an aft axial end at a second radial distance from the central axis that is greater than the first radial distance. The second seal member extends radially outward beyond the first radial distance.

In some embodiments, the inner ring segment has a radially outward facing surface that defines the opening of the channel. The radially outward facing surface is located at a third radial distance from the central axis. The second seal member extends radially inward beyond the third radial distance and into the channel.

In some embodiments, the first seal member is located axially aft of the first bearing aperture. In some embodiments, the entire inner ring segment is located radially inward of a radially outermost surface of the first vane mount segment.

In some embodiments, the first vane mount segment extends axially a first distance between a fore end and an aft end thereof. The inner ring segment extends axially a second distance between a fore end and an aft end thereof. The first distance is greater than the second distance.

According to another aspect of the present disclosure, a method of making a compressor assembly includes a number of steps. The method may include inserting a first variable vane into a first bearing aperture formed in a first vane mount segment, inserting a second variable vane into a second bearing aperture formed in a second vane mount segment, and moving an inner ring segment circumferentially about a central axis such that the first vane mount segment and the second vane mount segment are received in a channel formed in the inner ring segment and interlocked with the inner ring segment, the inner ring segment having a first tongue that extends into a first groove formed in the first vane mount segment and a second tongue that extends into a second groove formed in first vane mount segment.

In some embodiments, the first vane mount segment includes a first mount body and a seal member. The first mount body includes the first bearing aperture. The seal member extends circumferentially away from the first mount body and into the second vane mount segment.

In some embodiments, the first vane mount segment extends axially a first distance between a fore end and an aft end thereof. The inner ring segment extends axially a second distance between a fore end and an aft end thereof. The first distance is greater than the second distance.

These and other features of the present disclosure will become more apparent from the following description of the illustrative embodiments.

DETAILED DESCRIPTION OF THE DRAWINGS

Figure 1:
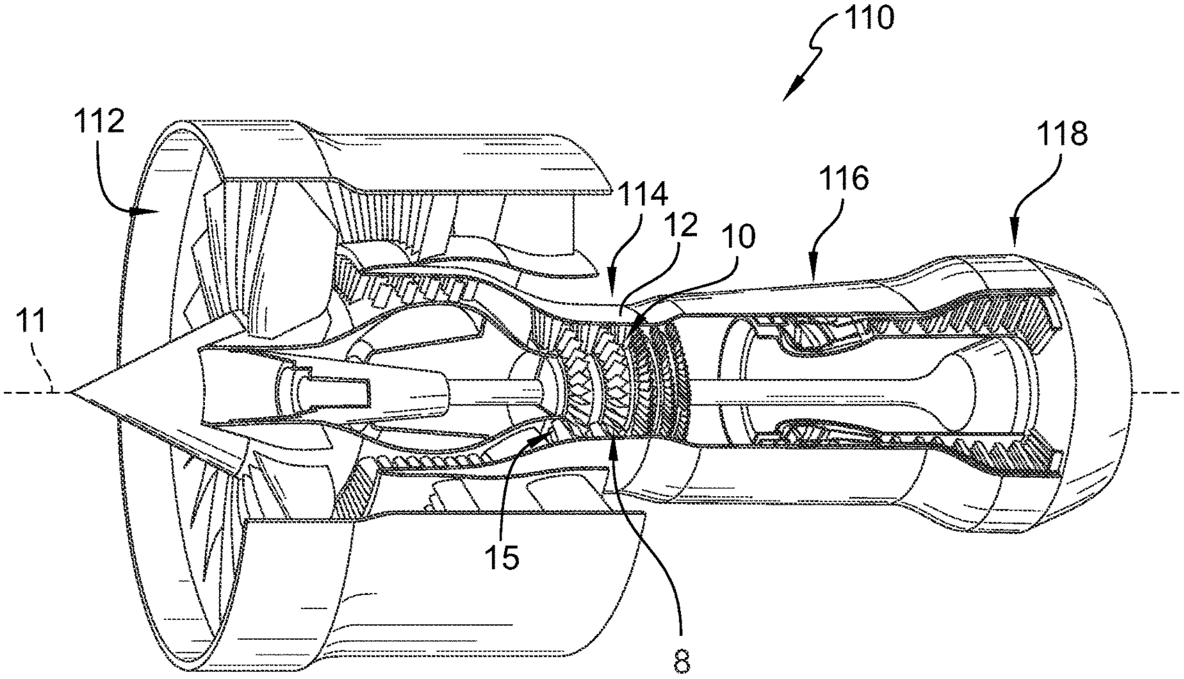
FIG. 1 is a perspective and cutaway view of a gas turbine engine having a fan, a compressor, a combustor, and a turbine.

For the purposes of promoting an understanding of the principles of the disclosure, reference will now be made to a number of illustrative embodiments illustrated in the drawings and specific language will be used to describe the same.

An illustrative gas turbine engine 110 includes a fan 112, a compressor 114, a combustor 116, and a turbine 118 as shown in FIG. 1. The fan 112 is driven by the turbine 118 and provides thrust for propelling an air vehicle, for example. The compressor 114 compresses and delivers pressurized air to the combustor 116. The combustor 116 mixes fuel with the compressed air received from the compressor 114 and ignites the fuel. The hot, high-pressure products of the combustion reaction in the combustor 116 are directed into the turbine 118. Rotation of the turbine 118 drives the compressor 114 and the fan 112.

The compressor 114 includes a plurality of bladed wheels 8 and a plurality of variable pitch vane assemblies 10 (also called a compressor assembly 10 herein), among other possible components, as suggested in FIG. 1. The bladed wheels 8 are configured to rotate about a central axis 11 and compress the pressurized air. The variable pitch vane assemblies 10 are configured to vary a direction of the pressurized air exiting a neighboring bladed wheel 8.

Figure 2:
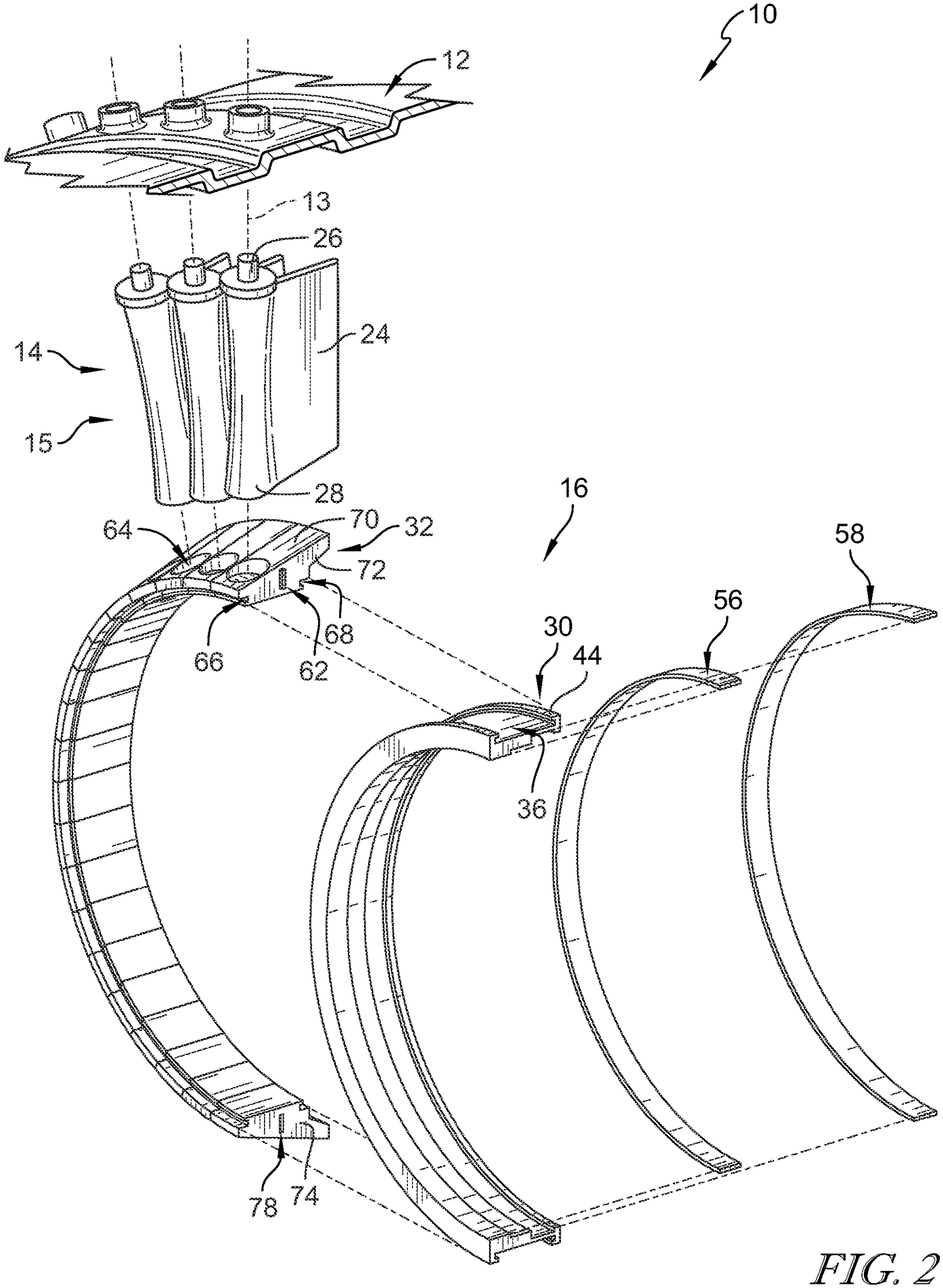
FIG. 2 is a perspective view of a variable vane assembly for the compressor of the gas turbine engine of FIG. 1 showing the assembly includes an outer band arranged around an axis, a plurality of variable pitch vanes, and an inner band having a plurality of vane mount segments coupled with the variable pitch vanes and an inner ring segment interlocked with the vane mount segments.
Figure 3:
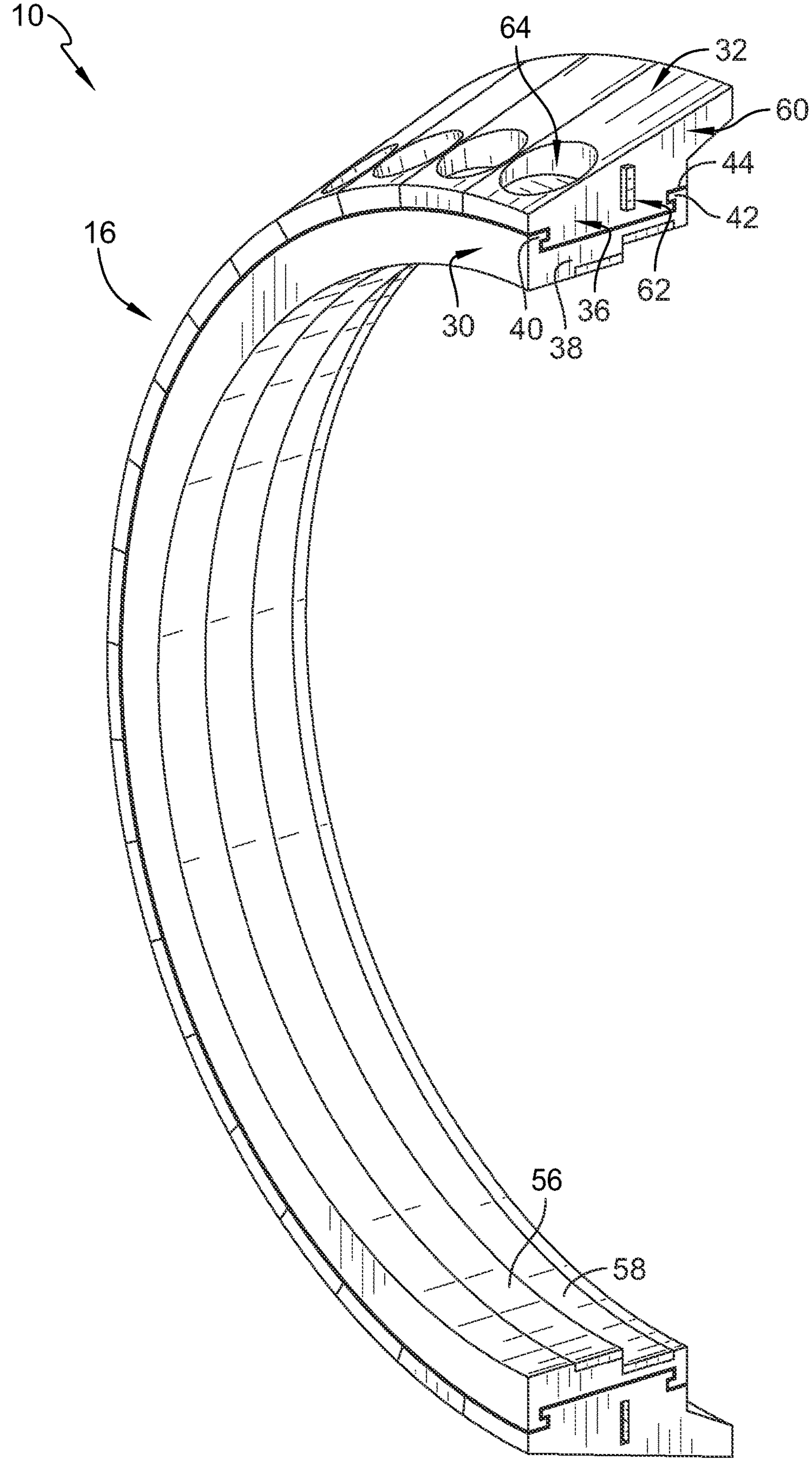
FIG. 3 is a perspective view of the inner band included in the assembly of FIG. 2 showing the inner band is adapted for a split case and extends approximately 180 degrees around the axis and suggesting that the vane mount segments slide into a channel in the inner ring segment to form the inner band.

An illustrative one of the variable pitch vane assemblies 10 is shown in FIGS. 2 and 3 and includes an outer band 12, a plurality of variable pitch vanes 14, and an inner band 16. The outer band 12 extends at least partway circumferentially around the central axis 11 to define an outer boundary of a gas path 15 of the vane assembly 10. The plurality of variable pitch vanes 14 are configured to vary the direction of the gas flowing through the gas path 15 of the vane assembly 10. The inner band 16 extends circumferentially at least partway about the central axis 11. The plurality of variable pitch vanes 14 extend radially between and portions of each vane 14 are received in the outer band 12 and the inner band 16.

In the illustrative embodiment, the outer band 12 is a split band that extends 180 degrees around the axis 11. Two outer band segments are coupled together to form a full 360 degree hoop for assembly and use in the gas turbine engine 110. The outer band 12 provides the outer case of the compressor 114 in the illustrative embodiment as suggested in FIG. 1. In other embodiments, the outer band 12 maybe coupled with the outer case of the compressor 114. The outer band 12 is made of aluminum in the illustrative embodiment. The outer band 12 includes a ring segment and a plurality of vane mounts configured to receive a portion of the variable pitch vanes 14 to couple the variable pitch vanes 14 with the outer band 12.

Each of the plurality of variable pitch vanes 14 extends radially inward from the outer band 12 relative to the central axis 11 as suggested in FIG. 2. Each of the plurality of variable pitch vanes 14 is configured to rotate about a pitch axis 13 that extends radially outward from the central axis 11 and through the corresponding variable pitch vane 14 so that the direction of the compressed gas being compressed by the bladed wheels 8 can be varied. Each of the plurality of variable pitch vanes 14 include an airfoil body 24, an outer support 26 that extends radially outward from the airfoil body 24 and into the vane mounts of the outer band 12, and an inner support 28 that extends radially inward from the airfoil body 24 and into the inner band 16.

In some conventional compressor designs, variable vanes are installed onto a conventional inner band by compressing or squeezing the inner band so that the vanes installed in the case or outer band fit between the outer band and the compressed inner band. The inner band is then released from the compression and expands toward its original diameter. This method of assembly may damage or permanently deform the inner band.

The inner band 16 of the present disclosure is adapted to facilitate assembly of the variable vanes 14 into the outer band 12 and the inner band 16 during assembly of the vane assembly 10. The inner band 16 includes an inner ring segment 30 and a plurality of vane mount segments 32 as shown in FIG. 2. The inner ring segment 30 extends circumferentially partway about the central axis 11 about 180 degrees and is configured to hold the vane mount segments 32 together. The vane mount segments 32 are configured to slide into the inner ring segment 30 and receive the inner support 28 of a corresponding variable pitch vane 14.

The vane mount segments 32 are configured to slide into the inner ring segment 30 during assembly to help with inserting the inner supports 28 of the vanes 14 into the inner band 16 while minimizing or eliminating the process of compressing the inner band 16 during assembly of the vane assembly 10. The inner band 16 for the present disclosure are adapted for axial split cases and a full hoop is divided in half circumferentially to provide two inner band segments 16 for assembly purposes. The inner band 16 includes the plurality of individual vane mount segments 32 held together with the 180 degree inner ring segment 30. In the illustrative embodiment, twenty vanes 14 are used with each inner band 16 with each vane mount segment 32 spanning approximately 9 degrees relative to the central axis 11.

The inner ring segment 30 is formed to define a radially outwardly opening channel 36 that extends circumferentially around the inner ring segment 30 as shown in FIGS. 2-5. The plurality of vane mount segments 32 are received in the channel 36 and interlocked with the inner ring segment 30 to couple the vane mount segments 32 with the inner ring segment 30. The illustrative inner ring segment 30 includes a forward axial surface that is continuous and planar and an aft axial surface that is continuous and planar.

Figure 4:
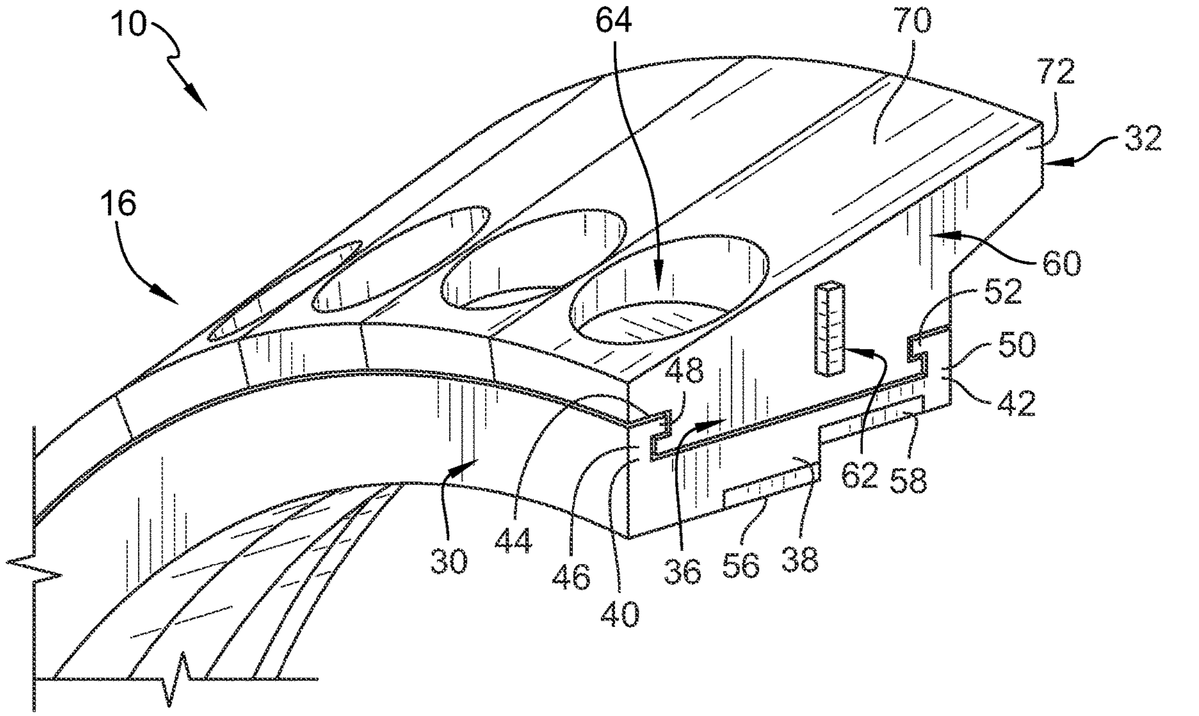
FIG. 4 is an enlarged perspective view of a first end of the inner band of FIG. 3 showing that each vane mount segment includes a mount body that forms the gas path of the assembly and a seal member that extends circumferentially away from the mount body.
Figure 5:
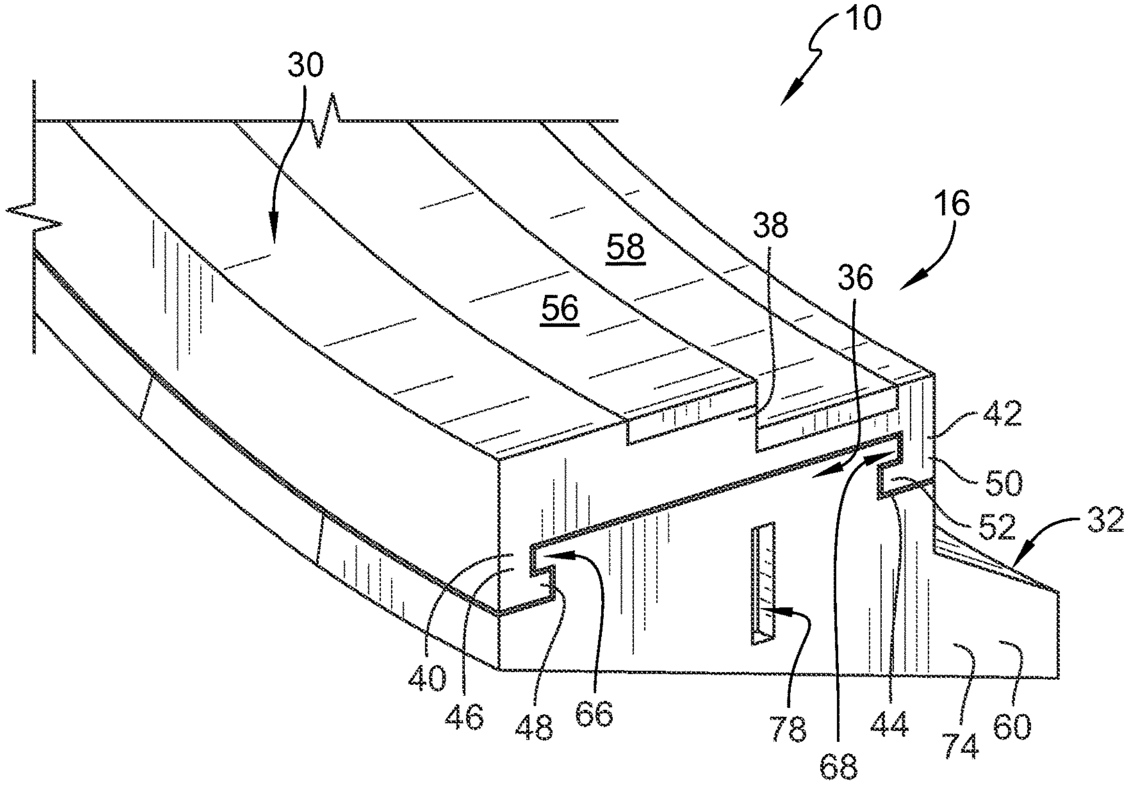
FIG. 5 is an enlarged perspective view of a second end of the inner band of FIG. 3 showing that the mount body of each vane mount segment is formed to define a slot sized to receive the seal member of a neighboring vane mount segment to block gases from flowing axially between the neighboring vane mount segments.
Figure 6:
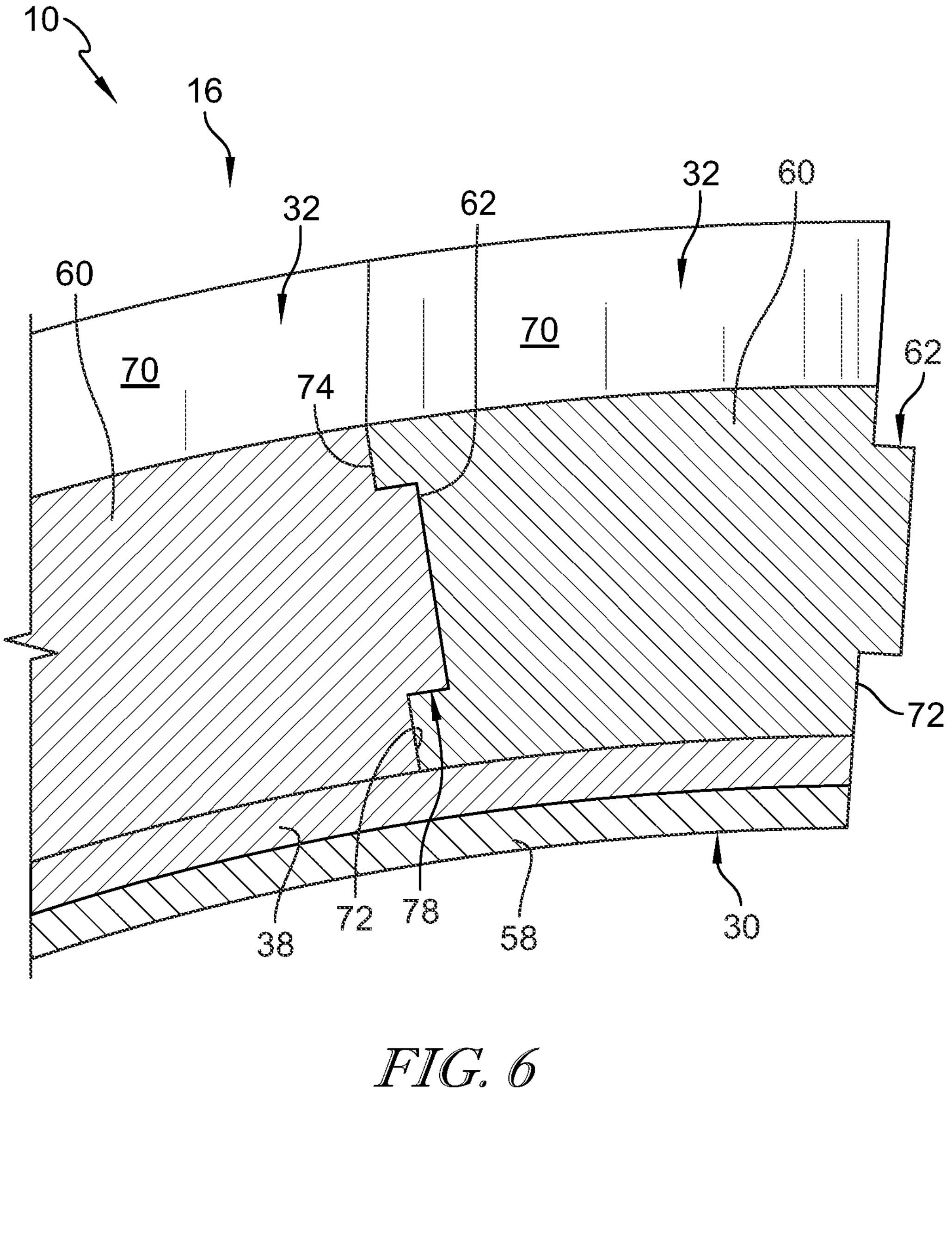
FIG. 6 is section view of the inner band of the assembly of FIG. 3 showing the seal member of a first vane mount segment extending into a slot of a neighboring second vane mount segment to block gas from flowing between the first and the second vane mount segments.

The inner ring segment 30 includes a ring body 38, a forward rail 40, and an aft rail 42 as shown in FIGS. 3-5. The ring body 38 defines an inner boundary of the channel 36. The forward rail 40 extends radially outward from a forward end of the ring body 38. The aft rail 42 extends radially outward from an aft end of the ring body 38. The forward rail 40 and the aft rail 42 cooperate with the ring body 38 to form the channel 36. The forward rail 40 and the aft rail 42 define a radial outer surface 44 of the inner ring segment 30. The radial outer surface 44 of the inner ring segment 30 has a substantially constant radius between the forward end and aft end of the ring body 38. In the illustrative embodiment, abradable material 56, 58 is coupled with a radially inner surface of the ring body 38.

The forward rail 40 includes a forward wall 46 that extends radially outward from the ring body 38 and a forward tongue 48 that extends axially aft from the forward wall 46 as shown in FIGS. 3-4. The forward wall 46 and the forward tongue 48 cooperate to define a groove that receives a portion of each vane mount segment 32. The aft rail 42 includes an aft wall 50 that extends radially outward from the ring body 38 and an aft tongue 52 that extends axially forward from the aft wall 50. The aft wall 50 and the aft tongue 52 cooperate to define a groove that receives a portion of each vane mount segment 32.

The ring body 38 has a constant radius outer surface that defines a radial inner portion of the channel 36. The ring body 38 defines a plurality of radially inward surfaces in the illustrative embodiment as shown in FIGS. 2-4. Each surface has a constant radius as it extends circumferentially about the central axis 11. The forward end of the ring body 38 has a small radius and the aft end of the ring body 38 has a greater radius in the illustrative embodiment.

In the illustrative embodiment, the inner band 16 further includes abradable material for knife seals on the inner ring segment 30. A first strip of abradable material 56 is applied to an inner surface of the ring body 38 such that the radial inward surface of the abradable material 56 is flush with the forward end of the ring body 38. A second strip of abradable material 58 is applied to an inner surface of the ring body 38 such that the radial inward surface of the abradable material 58 is flush with the aft end of the ring body 38. In other embodiments, the abradable material may be a single strip, multiple strips, and/or applied in other arrangements and radial distances.

Each vane mount segment 32 includes a mount body 60 and a seal member 62 as shown in FIGS. 2-6. The mount body 60 is interlocked with the inner ring segment 30 and receives the inner support 28 of one of the variable vanes 14. The seal member 62 extends circumferentially away from the mount body 60 and interfaces with a neighboring vane mount segment 32 to block gases from passing axially between adjacent vane mount segments 32.

Each mount body 60 of a vane mount segment 32 is formed to include a bearing aperture 64 that extends radially into the mount body 32 of the vane mount segment 32 as shown in FIGS. 2-5. The bearing aperture 64 receives a portion of a corresponding one of the variable pitch vanes 14 included in the plurality of variable pitch vanes 14. The bearing aperture 64 (counterbored hole) is drilled or otherwise formed into each of the plurality of vane mount segments 32 to receive the round inner vane support 28 (also called pennies). An entirety of the bearing aperture 64 of each vane mount segment 32 is located axially forward of an axial midpoint of the inner ring segment 16 in the illustrative embodiment.

The inner ring segment 30 connects the vane mount segments 32 through tongue-and-groove type interfaces on the forward and aft sides of the vane mount segments 32. The mount body 60 of each vane mount segment 32 is formed to define a circumferentially extending forward groove 66 and a circumferentially extending aft groove 68. The forward groove 66 extends axially into the forward end of the mount body 60 and the aft groove 68 extends axially into the aft end of the mount body 60. The forward tongue 48 of the forward rail 40 in the inner ring segment 30 extends axially into the forward groove 66 and the aft tongue 52 of the aft rail 42 in the inner ring segment 30 extends axially into the aft groove 68 to interlock the vane mount segment 32 with the inner ring segment 30 as shown in FIGS. 4 and 5.

The mount body 60 has a radially outer surface 70, a circumferentially facing first wall 72, and a circumferentially facing second wall 74, among other surfaces, as shown in FIGS. 3-6. The radially outer surface 70 defines a portion of the inner boundary of the gas path 15. The second wall 74 is spaced apart circumferentially from the first wall 72.

The seal members 62 (rectangle tabs) project from the walls 72 of the segments as shown in FIG. 2. These seal members 62 pocket into analogous slots 78 or grooves on the adjacent segments 32 as shown in FIGS. 3 and 5. These seal members 62 serve to reduce air leakage going between the segments 32 in the aft-to-forward direction due to the air pressure differential across the vanes 14.

The second wall 74 is formed to define the slot 78 that extends circumferentially into the circumferentially facing second wall 74. The seal member 62 of each vane mount segment 32 extends circumferentially from the circumferentially facing first wall 72 and is received in the slot 78 of a neighboring vane mount segment 32 to block the gas from flowing axially between the plurality of vane mount segments 32 as suggested in FIG. 6.

The outer surface 70 forms the entirety of the inner boundary of the gas path 15 of the compressor assembly 10 in the illustrative embodiment. The vane mount segments 32 extend axially a first distance between a fore end and an aft end thereof. The inner ring segment 30 extends axially a second distance between a fore end and an aft end thereof. The first distance is greater than the second distance such that the inner ring segment 16 is within the axial footprint of the outer surface 70 of the vane mount segments 32. In other words, the inner ring segment 16 is within an axial footprint of the outer surface 70 of the vane mount segments 32 such that the inner ring segment 30 is not directly exposed to the gas path 15. The entire inner ring segment 30 is located radially inward of the radially outermost surface 70 of the vane mount segment 32 in the illustrative embodiment.

The outer surface 70 extends between a forward axial end at a first radial distance from the central axis and an aft axial end at a second radial distance from the central axis that is greater than the first radial distance as shown in FIGS. 3-5. In other words, the outer surface 70 extends at an angle and increases in radial height as it extends aft. The radially outer surface 70 of each vane mount segment 32 extends at an angle relative to the central axis 11 between about 0 and about 30 degrees. In some embodiments, the radially outer surface 70 of each vane mount segment 32 extends at an angle relative to the central axis 11 between about 10 and about 20 degrees. In the illustrative embodiment, the radially outer surface 70 of each vane mount segment 32 extends at an angle relative to the central axis 11 at about 15 degrees.

Each seal member 62 extends radially outward beyond the first radial distance as shown in FIG. 4. The inner ring segment 30 has a radially outward facing surface 44 that defines the opening of the channel 36. The radially outward facing surface 44 is located at a third radial distance from the central axis 11. The surface 44 is generally parallel with the central axis 11. Each seal member 62 extends radially inward beyond the third radial distance and into the channel 36 as shown in FIGS. 3-6. Each seal member 62 has a radial height and an axial width and the radial height is greater than the axial width in the illustrative embodiment. Each seal member 62 is located axially aft of the bearing aperture 64 of each vane mount segment 32 as shown in FIGS. 2-3.

A method of making the compressor assembly 10 includes a number of steps. During assembly each variable vane 14 is placed into the axial split outer band 12 and then into each vane mount segment 32 on the inner vane pennies 64. The inner ring segment 30 is then slid across the bottom of the vane mount segments 32 in the circumferential direction to hold the assembly in place. Each stage of variable vanes would go through a similar assembly sequence on each axial split case half.

A first variable vane 14 is inserted into a first bearing aperture 64 formed in a first vane mount segment 32. A second variable vane 14 is inserted into a second bearing aperture 64 formed in a second vane mount segment 32. The inner ring segment 30 is moved circumferentially about the central axis 11 such that the first vane mount segment 32 and the second vane mount segment 32 are received in a channel 36 formed in the inner ring segment 30 and interlocked with the inner ring segment 30.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor assembly for a gas turbine engine, the compressor assembly comprising an outer band that extends at least partway circumferentially around a central axis to define an outer boundary of a gas path of the compressor assembly, a plurality of variable pitch vanes configured to vary a direction of a gas flowing through the gas path of the compressor assembly, each of the plurality of variable pitch vanes extends radially inward from the outer band relative to the central axis, and each of the plurality of variable pitch vanes being configured to rotate about a pitch axis that extends radially outward from the central axis and through the corresponding variable pitch vane included in the plurality of variable pitch vanes, and an inner band that extends circumferentially at least partway about the central axis and receives a portion of each of the plurality of variable pitch vanes, the inner band including an inner ring segment formed to define a radially outwardly opening channel that extends circumferentially around the inner ring segment and a plurality of vane mount segments interlocked with the inner ring segment in the channel to define an inner boundary of the gas path of the compressor assembly, each vane mount segment included in the plurality of vane mount segments formed to include a bearing aperture that extends radially into the vane mount segment and receives a portion of a corresponding one of the variable pitch vanes included in the plurality of variable pitch vanes, wherein each vane mount segment included in the plurality of vane mount segments is formed to define a circumferentially extending first groove and the inner ring segment includes a first tongue that extends axially into the first groove to interlock the vane mount segment with the inner ring segment, wherein an entirety of the bearing aperture of each vane mount segment is located axially forward of an axial midpoint of the inner ring.

2. The compressor assembly of claim 1, wherein each vane mount segment included in the plurality of vane mount segments has a mount body and a seal member, the mount body has a circumferentially facing first wall and a circumferentially facing second wall spaced apart circumferentially from the circumferentially facing first wall, the circumferentially facing second wall is formed to define a slot that extends circumferentially into the circumferentially facing second wall, and the seal member extends circumferentially from the circumferentially facing first wall of each vane mount segment that is received in the slot of a neighboring vane mount segment to block the gas from flowing axially between the plurality of vane mount segments.

3. The compressor assembly of claim 2, wherein each seal member has a radial height and an axial width and the radial height is greater than the axial width.

4. The compressor assembly of claim 3, wherein each vane mount segment included in the plurality of vane mount segments has a radially outer surface that defines a portion of the inner boundary of the gas path, the outer surface extends between a forward axial end at a first radial distance from the central axis and an aft axial end at a second radial distance from the central axis that is greater than the first radial distance, and each seal member extends radially outward beyond the first radial distance.

5. The compressor assembly of claim 4, wherein the inner ring segment has a radially outward facing surface that defines the opening of the channel, the radially outward facing surface is located at a third radial distance from the central axis, and each seal member extends radially inward beyond the third radial distance and into the channel.

6. The compressor assembly of claim 2, wherein each seal member is located axially aft of the bearing aperture of each vane mount segment included in the plurality of vane mount segments.

7. The compressor assembly of claim 1, wherein each vane mount segment has a radially outer surface and the radially outer surfaces of the plurality of vane mount segments form the entirety of the inner boundary of the gas path of the compressor assembly.

8. The compressor assembly of claim 7, wherein the radially outer surface of each vane mount segment extends at an angle relative to the central axis of between about 10 and about 20 degrees.

9. A compressor assembly for a gas turbine engine, the compressor assembly comprising an inner ring segment that extends partway circumferentially about a central axis, the inner ring segment formed to define a radially outwardly opening channel that extends circumferentially around the inner ring segment, a first vane mount segment located in the channel and interlocked with the inner ring, the first vane mount segment having a first mount body formed to define a first bearing aperture that extends radially inward into the first mount body and a seal member that extends circumferentially away from the first mount body, and a second vane mount segment located in the channel and interlocked with the inner ring, the second vane mount segment having a second mount body formed to define a second bearing aperture that extends radially inward into the second mount body and a second seal member that extends circumferentially away from the second mount body and into the first mount body of the first vane mount segment to block gases from passing axially between the first vane mount segment and the second vane mount segment, wherein the second seal member has a radial height and an axial width and the radial height is greater than the axial width.

10. The compressor assembly of claim 9, wherein the first mount segment is formed to define a circumferentially extending first groove that extends axially into the first mount body and the inner ring segment includes a first tongue that extends axially into the first groove to interlock the first vane mount segment with the inner ring segment.

11. The compressor assembly of claim 9, wherein the first vane mount segment has a radially outer surface that defines a portion of an inner boundary of a gas path, the outer surface extends between a forward axial end at a first radial distance from the central axis and an aft axial end at a second radial distance from the central axis that is greater than the first radial distance, and the second seal member extends radially outward beyond the first radial distance.

12. The compressor assembly of claim 11, wherein the inner ring segment has a radially outward facing surface that defines the opening of the channel, the radially outward facing surface is located at a third radial distance from the central axis, and the second seal member extends radially inward beyond the third radial distance and into the channel.

13. The compressor assembly of claim 9, wherein the first seal member is located axially aft of the first bearing aperture.

14. The compressor assembly of claim 9, wherein the first vane mount segment extends axially a first distance between a fore end and an aft end thereof, the inner ring segment extends axially a second distance between a fore end and an aft end thereof, and the first distance is greater than the second distance.

15. The compressor assembly of claim 9, wherein the entire inner ring segment is located radially inward of a radially outermost surface of the first vane mount segment.

16. A method of making a compressor assembly, the method comprising inserting a first variable vane into a first bearing aperture formed in a first vane mount segment, inserting a second variable vane into a second bearing aperture formed in a second vane mount segment, and moving an inner ring segment circumferentially about a central axis such that the first vane mount segment and the second vane mount segment are received in a channel formed in the inner ring segment and interlocked with the inner ring segment, the inner ring segment having a first tongue that extends into a first groove formed in the first vane mount segment and a second tongue that extends into a second groove formed in first vane mount segment, wherein the first vane mount segment includes a first mount body that includes the first bearing aperture and a seal member that extends circumferentially away from the first mount body and into the second vane mount segment, wherein the seal member has a radial height and an axial width and the radial height is greater than the axial width.

17. The method of claim 16, wherein the first vane mount segment extends axially a first distance between a fore end and an aft end thereof, the inner ring segment extends axially a second distance between a fore end and an aft end thereof, and the first distance is greater than the second distance.

18. The method of claim 16, wherein the first mount body has a circumferentially facing first wall and a circumferentially facing second wall spaced apart circumferentially from the circumferentially facing first wall, the circumferentially facing second wall is formed to define a first slot that extends circumferentially into the circumferentially facing second wall, and the seal member extends circumferentially from the circumferentially facing first wall of the first mount segment into a second slot of the second vane mount segment to block the gas from flowing axially between the first vane mount segment and the second vane mount segment.

19. The method of claim 18, wherein an entirety of the first bearing aperture of the first vane mount segment is located axially forward of an axial midpoint of the inner ring segment.

* * * * *